(12) United States Patent
Sohmura et al.

(10) Patent No.: US 7,101,089 B2
(45) Date of Patent: Sep. 5, 2006

(54) JACK MODULE FOR OPTICAL TRANSMISSION AND PLUG-AND-JACK TYPE OPTICAL TRANSMISSION APPARATUS

(75) Inventors: Atsushi Sohmura, Kitakatsuragi-gun (JP); Takatoshi Mizoguchi, Gojo (JP); Koji Nagasaka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 85 days.

(21) Appl. No.: 10/201,476

(22) Filed: Jul. 23, 2002

(65) Prior Publication Data

US 2003/0016920 A1    Jan. 23, 2003

(30) Foreign Application Priority Data

Jul. 23, 2001 (JP) ............................. 2001-221307
May 29, 2002 (JP) ............................. 2002-155368

(51) Int. Cl.
G02B 6/36 (2006.01)

(52) U.S. Cl. ...................................................... 385/88

(58) Field of Classification Search ............ 385/88–94, 385/76–78, 24, 14, 49
See application file for complete search history.

(56) References Cited

U.S. PATENT DOCUMENTS

| | | | | |
|---|---|---|---|---|
| 5,283,851 A * | 2/1994 | Vergnolle | .................... | 385/134 |
| 5,416,624 A * | 5/1995 | Karstensen | .................. | 398/139 |
| 5,937,122 A * | 8/1999 | Ohki et al. | .................... | 385/78 |
| 5,993,075 A * | 11/1999 | Huang et al. | ................. | 385/92 |
| 6,078,712 A * | 6/2000 | Tschope et al. | ............. | 385/101 |
| 6,109,797 A * | 8/2000 | Nagura et al. | ................ | 385/88 |
| 6,188,495 B1 * | 2/2001 | Inoue et al. | ................. | 398/139 |
| 6,217,231 B1 * | 4/2001 | Mesaki et al. | ................ | 385/88 |
| 6,302,596 B1 * | 10/2001 | Cohen et al. | ................ | 385/93 |
| 6,341,898 B1 * | 1/2002 | Matsushita | .................... | 385/88 |
| 6,453,091 B1 * | 9/2002 | Kawai | .......................... | 385/33 |
| 6,454,467 B1 * | 9/2002 | Ishihara et al. | ............... | 385/88 |
| 6,553,166 B1 * | 4/2003 | Caldwell | ..................... | 385/100 |
| 6,623,179 B1 * | 9/2003 | Hurt et al. | .................... | 385/92 |
| 6,718,091 B1 * | 4/2004 | Ishihara et al. | ............... | 385/36 |
| 6,729,771 B1 * | 5/2004 | Kim et al. | .................... | 385/76 |
| 6,769,820 B1 * | 8/2004 | Ohe et al. | ..................... | 385/92 |
| 6,769,821 B1 * | 8/2004 | Ohe et al. | ..................... | 385/92 |
| 6,793,412 B1 * | 9/2004 | Nishita | ........................ | 385/93 |

FOREIGN PATENT DOCUMENTS

| | | |
|---|---|---|
| JP | 6-140106 | 5/1994 |
| JP | 8-234063 | 9/1996 |

* cited by examiner

*Primary Examiner*—Joseph Williams
*Assistant Examiner*—Dalei Dong
(74) *Attorney, Agent, or Firm*—David G. Conlin; Steven M. Jensen; Edwards Angell Palmer & Dodge, LLP

(57) ABSTRACT

A jack module for optical transmission has, on a holder body into which a specified plug is to be inserted, an optical semiconductor device for inputting and outputting an optical signal via the plug. The optical semiconductor device is so constructed that a light-emitting chip and a light-receiving chip are mounted on a one-side surface of a lead frame, where the light-emitting chip and the light-receiving chip are integrally molded with a light-pervious resin. The surface of the lead frame is disposed so as to be inclined with respect to a center axis of the plug inserted into the holder body. The jack module for optical transmission is capable of easily performing communications in the half-duplex method, simple in construction and manufacturable at small size and low cost.

22 Claims, 10 Drawing Sheets

Fig. 2

*Fig. 10A*
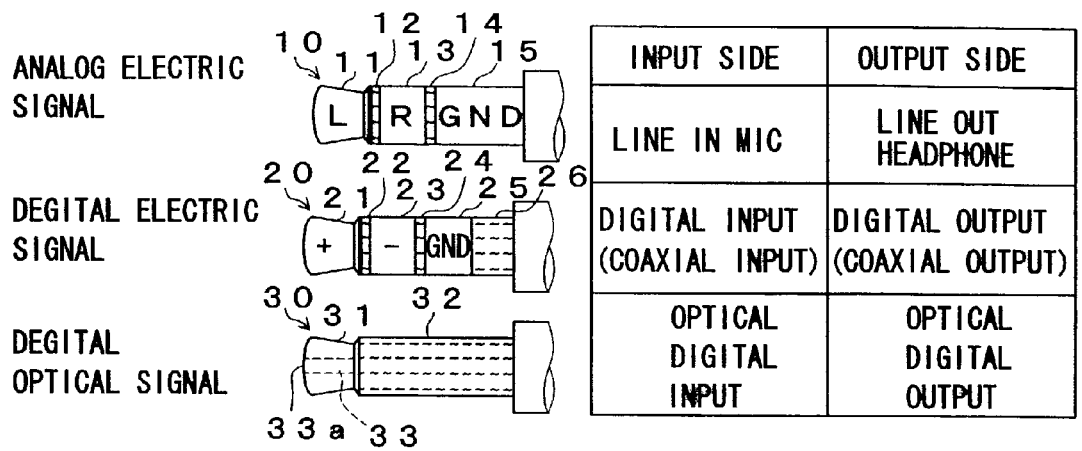
*Fig. 10B*
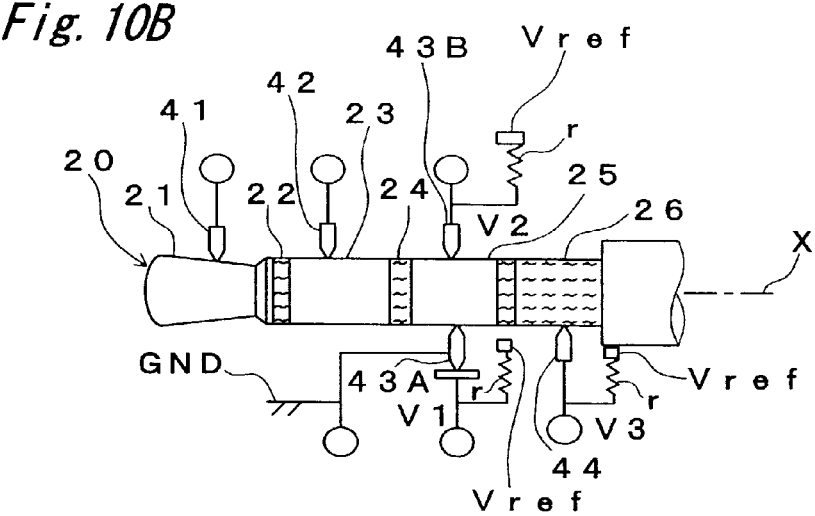
*Fig. 10C*
| TYPE OF PLUG | OUTPUT OF TERMINAL | | |
|---|---|---|---|
| | V1 | V2 | V3 |
| ANALOG ELECTRIC | L | L | L |
| DIGITAL ELECTRIC | L | L | H |
| DIGITAL OPTICAL | L | H | H |
| NO PLUG | H | H | H | ically equipped with a PDF-type OCR.

JACK MODULE FOR OPTICAL TRANSMISSION AND PLUG-AND-JACK TYPE OPTICAL TRANSMISSION APPARATUS

BACKGROUND OF THE INVENTION

The present invention relates to a jack module for optical transmission, and more particularly, to a jack module into which specified plugs are to be inserted for inputting and outputting (relaying included, which is applicable throughout hereinafter) optical signals to and from electronic equipment.

The invention also relates to a plug-and-jack type optical transmission apparatus in which a signal-transmission cable having specified plugs at both ends, and a pair of optical-transmission jack modules for inputting and outputting optical signals, are combined together so that communications in the half-duplex method can be performed through the signal-transmission cable between electronic equipments having the jack modules respectively.

Still also, the invention relates to a jack module for both optical and electrical use, and a plug-and-jack type transmission apparatus for both optical and electrical use, having a construction that the jack module for optical transmission or the plug-and-jack type optical transmission apparatus is provided with electrical connection terminals for discriminating the type of a plug inserted thereinto and for inputting and outputting electric signals via the plug.

In this specification, the terms, "electronic equipment," refer to a wide range of equipment that handles electronic information such as CDs (Compact Discs), MDs (Mini Discs), DATs (Digital Audio Tapes), DVDs (Digital Video Discs), computers and PDAs (personal digital assistants), etc. In addition, the terms, "electronic information," include not only digital information but also analog information.

Conventionally, there has been known a jack module for both optical and electrical use having a construction that, as shown in FIGS. 9A and 9B, a holder body 102 into which a plurality of specified types of plugs are to be inserted is provided with an optical semiconductor device 103 for inputting and outputting optical signals and a plurality of electrical connection terminals 40 for discriminating the type of a plug inserted thereinto and for inputting and outputting electric signals (where the whole unit of the jack module is denoted by reference numeral 101) (e.g., Japanese Patent Laid-Open Publication H06-140106). FIG. 9A shows an example in which a small-size single-head electric plug (for analog electric signals) 10 is inserted, and FIG. 9B shows an example in which an optical fiber plug 30 is inserted.

The optical semiconductor device 103 is so formed that a light-emitting chip 105 and a driver IC (Integrated Circuit) chip 106 for driving this light-emitting chip 105 are mounted on one side 104a of a lead frame 104, where these component members are molded into a generally rectangular parallelopiped shape with a transparent resin (sealing resin) 107. The chip-mounted surface 104a of the lead frame 104 is disposed vertical to a center axis X of the plug to be inserted. In the illustrated optical semiconductor device 103, which is to be provided on the transmission side of one-way communications, the light-emitting chip 105 is disposed on an extension of the center axis X of the plug, and the driver IC chip 106 is disposed in its neighborhood. In contrast to this, in the case of jack module, which is to be provided on the reception side of one-way communications, a light-receiving chip is disposed on an extension of the center axis X of the plug, and a signal-processing IC chip which handles the output of the light-receiving chip is disposed in its neighborhood. The rest of the construction is the same as that of the transmission side.

The electrical connection terminals 40 are disposed in a plurality along the center axis X of the plug to be inserted. The plugs that are intended for insertion include, as shown in FIG. 10A, an electric plug 10 for analog electric signals, an electric plug 20 for digital electric signals, and an optical fiber plug 30 for inputting and outputting digital optical signals. The electric plug 10 for analog electric signals has, in an order from its fore end, a chip portion 11 for inputting and outputting a left (L) signal, an insulated collar portion 12, a ring portion 13 for inputting and outputting a right (R) signal, an insulated collar portion 14, and a sleeve portion 15 of ground (GND) potential. The electric plug 20 for digital electric signals has, in an order from its fore end, a chip portion 21 for inputting and outputting a plus (+) signal, an insulated collar portion 22, a ring portion 23 for inputting and outputting a minus (−) signal, an insulated collar portion 24, a sleeve portion 25 of ground (GND) potential, and an insulated sleeve portion 26. The optical fiber plug 30 has, in an order from its fore end, a chip portion 31 and a sleeve portion 32. In this optical fiber plug 30, an optical fiber 33 passes through at its center, while an end face 33a of the optical fiber 33 is exposed at a fore end of the chip portion 31.

Outside dimensions of these plugs 10, 20, 30 are set to the same ones according to the standards so as to be insertable to the same jack module. Each chip portion is formed into a fusiform shape, and each ring portion and each sleeve portion are formed into a cylindrical shape. The sleeve portion 15 of the electric plug 10 for analog electric signals is provided over a range corresponding to a range over which the insulated sleeve portion 25 and the sleeve portion 26 of the electric plug 20 for digital electric signals are provided.

In correspondence to the above structure of the plugs 10, 20, 30, as shown in FIG. 10B, the electrical connection terminals of the jack module 101 are placed at four positions along the center axis X of the plug to be inserted, respectively. That is, with regard to the electric plug 20 for digital electric signals, which has the largest number of divisions, an electrical connection terminal 41 is placed at a first position for contact with the chip portion 21, and so are an electrical connection terminal 42 at a second position for contact with the (−) ring portion 23, electrical connection terminals 43A, 43B at a third position for contact with the GND sleeve portion 25, and an electrical connection terminal 44 at a fourth position for contact with the insulated sleeve portion 26.

For discrimination of the type of a plug that has been inserted, a reference voltage Vref is applied via current limiting resistors r to the electrical connection terminals 43A, 43B placed at the third position and the electrical connection terminal 44 placed at the fourth position, respectively. Further, the electrical connection terminal 43A, which is one of the electrical connection terminals placed at the third position, is grounded. Given that voltages of these terminals 43A, 43B and 44 are V1, V2 and V3, respectively, these voltages V1, V2 and V3 are at such levels as shown in FIG. 10C according to the types of inserted plugs (where high level is represented by "H" and low level by "L"). Accordingly, if the inserted plug is the electric plug 10 for analog electric signals, then the voltages V1, V2 and V3 are all at "L". If the inserted plug is the electric plug 20 for digital electric signals, then the voltages V1, V2 and V3 are at "L", "L" and "H", respectively. If the inserted plug is the optical fiber plug 30, then the voltages V1, V2 and V3 are at "L", "H" and "H", respectively. In addition, if no plug is inserted, the voltages V1, V2 and V3 are all at "H". Therefore, the type of an inserted plug can be discriminated based on these voltages V1, V2 and V3.

If the inserted plug is the electric plug 10 for analog electric signals or the electric plug 20 for digital electric signals, then electric signals can be inputted and outputted via the electrical connection terminal 41 placed at the first position and the electrical connection terminal 42 placed at the second position. During communications in electric signals, the optical semiconductor device 103 shown in FIG. 9 holds in a halt state.

Meanwhile, if the inserted plug is the optical fiber plug 30 as shown in FIG. 9B, the optical semiconductor device 103 becomes operative. In this example, signal light emitted from the light-emitting chip 105 is converged by a lens portion 107a formed at the surface of the sealing resin 107, coming incident on the internal of the optical fiber 33 through the end face 33a of the optical fiber plug 30. Then, the incident light is transmitted through the optical fiber cable 50, reaching a reception-side jack module for both optical and electrical use via an unshown optical fiber plug (of the same structure as the optical fiber plug 30) provided at the other end of the optical fiber cable 50. As already described, in the reception-side jack module, the optical semiconductor device is so constructed that a light-receiving chip is disposed on an extension of the center axis X of the plug, and a signal-processing IC chip which handles outputs of the light-receiving chip is disposed in its neighborhood. Accordingly, signal light emitted from the end face of the optical fiber plug comes incident on the light-receiving chip, and is subjected to signal processing by the signal-processing IC chip. During communications in optical signals, the electrical connection terminals 40 hold in a halt state.

In this connection, since the communications method using the above jack module are one-way communications, implementing two-way communications involves two transmission cables each having plugs at both ends and a total of four jack modules into which the plugs are to be inserted, respectively. This causes increases in component parts, leading to increases in the apparatus scale, disadvantageously.

Therefore, it has recently been attempted that in a jack module, light-emitting chip and light-receiving chip are disposed in juxtaposition on a plane vertical to the center axis of the plug to be inserted, in order to implement full-duplex (simultaneous two-way) communications. In this full-duplex communications method, two-way communications are enabled with one transmission cable having plugs at both ends, and a total of two jack modules into which each plug is to be inserted. However, the full-duplex communications method encounters a problem of noise occurrence due to optical crosstalk (a phenomenon that an optical output of a light-emitting chip is reflected to go incident on a light-receiving chip in the same jack module) Taking measures for effects of this optical crosstalk causes complexities in apparatus construction and signal processing, which in turn causes increases in the load for signal processing. This would result in increases in size and price of the apparatus.

On the other hand, in the half-duplex communications method (a method in which communications are in one way at some instant, but two-way communications are performed by switching), two-way communications can be implemented with one transmission cable having plugs at both ends, and a total of two jack modules into which the plugs are to be inserted, respectively, and moreover the problem of optical crosstalk does not occur.

These problems come to issues not only with jack modules for both optical and electrical use, but also with jack modules that perform optical transmission but that do not necessarily have electrical connection terminals (which jack modules are generically referred to as "jack modules for optical transmission").

SUMMARY OF THE INVENTION

Accordingly, an object of the present invention is to provide a jack module for optical transmission (including jack module for both optical and electrical use) which is capable of easily performing communications in the half-duplex method, simple in construction and manufacturable at small size and low cost.

A further object of the invention is to provide a plug-and-jack type optical transmission apparatus (including plug-and-jack type transmission apparatus for both optical and electrical use) in which a signal-transmission cable having specified plugs at both ends and a pair of jack modules for both optical and electrical use for inputting and outputting optical signals or electric signals are together so that communications in the half-duplex method can be implemented through the signal-transmission cable between electronic equipments having the jack modules respectively, the transmission apparatus being simple in construction and manufacturable at small size and low cost.

In order to achieve the above object, the jack module for optical transmission of the present invention has the following constitution. The jack module for optical transmission of the present invention comprises a holder body into which a specified plug is to be inserted, and an optical semiconductor device for inputting and outputting an optical signal via the plug, wherein the optical semiconductor device is so constructed that a light-emitting chip and a light-receiving chip are mounted on a one-side surface of a lead frame, where the light-emitting chip and the light-receiving chip are integrally molded with a light-pervious resin, and the surface of the lead frame is disposed so as to be inclined with respect to a center axis of the plug inserted into the holder body.

The terms, "lead frame," refer to a wide range of members having a surface on which a chip is to be mounted. Typically, the lead frame is an electrically conductive member having a planar element for mounting thereon a chip, and an interconnection element for electrically connecting the mounted chip and an external signal processing circuit to each other.

The "light-emitting chip" may include not only such an element that emits light such as LEDs (Light-Emitting Diodes) or semiconductor lasers, but also a drive circuit for driving (supplying electric current to) the element that emits light or the like. Also, the "light-receiving chip" may include not only an element that receives light such as photodiodes but also a signal circuit that converts the light into an electric signal.

In the jack module for optical transmission according to the present invention, the surface of the lead frame on which the light-emitting chip and the light-receiving chip are mounted (hereinafter, the surface is referred to as "chip-mounted surface" as appropriate) is disposed so as to be inclined with respect to the center axis of the plug inserted into the holder body. Accordingly, as viewed from the end face of the plug inserted into the holder body, the light-emitting chip and the light-receiving chip can be disposed within a small angular range from the center axis of the plug, as compared with the case where the chip-mounted surface is disposed vertical to the center axis of the plug. In this case, optical coupling between the end face of the plug and the light-emitting chip or the light-receiving chip is fulfilled with a simple structure using no optical branch elements such as prisms or beam splitters. Accordingly, communications in the half-duplex method can easily be performed with a combination of one transmission cable having specified plugs at both ends and a pair of the jack modules for optical transmission according to the invention. Also, since the optical semiconductor device is so constructed that the light-emitting chip and the light-receiving chip are mounted on the common lead frame, where the light-emitting chip and the light-receiving chip are integrally molded with a light-pervious resin, commonization of terminals and reduction in parts count become achievable, as compared with the case where those chips are molded independently of each other. Accordingly, the apparatus can be reduced in size and cost.

In one embodiment, the inclination of the surface of the lead frame is set to such a direction that the light-emitting chip is disposed on one side closer to the end face of the plug while the light-receiving chip is disposed on another side farther from the end face of the plug.

In the jack module for optical transmission of this embodiment, optical coupling efficiency between the end face of the plug and the light-emitting chip or the light-receiving chip is improved.

In one embodiment, within the holder body, a space between the end face of the plug and the lead frame of the optical semiconductor device is filled with the light-pervious resin of same composition.

As in the case of the chip-mounted surface of the lead frame, when the molding surface of the optical semiconductor device is disposed so as to be inclined with respect to the center axis of a plug inserted into the holder body, the light emitted from the end face of the plug is partly lost by oblique reflection at the molding surface of the optical semiconductor device. Therefore, in the jack module for optical transmission of this embodiment, within the holder body, a space between the end face of the plug and the lead frame of the optical semiconductor device is filled with the light-pervious resin of the same composition. Accordingly, the light emitted from the end face of the plug can be prevented from being partly lost by oblique reflection at the molding surface of the optical semiconductor device.

In one embodiment, within the holder body, a space between the end face of the plug and the molding surface of the optical semiconductor device is filled with a light-pervious resin having a refractive index lower than that of the light-pervious resin.

In the jack module for optical transmission of this embodiment, light emitted from the end face of the plug reaches the light-receiving chip of the optical semiconductor device with high efficiency. Conversely, light emitted by the light-emitting chip of the optical semiconductor device reaches the end face of the plug with high efficiency, as well. Accordingly, the optical coupling efficiency between the end face of the plug and the light-emitting chip or the light-receiving chip can be improved.

The jack module for optical transmission of the present invention comprises a holder body into which a specified plug is to be inserted, and an optical semiconductor device for inputting and outputting an optical signal via the plug, wherein the optical semiconductor device is so constructed that a light-emitting chip and a light-receiving chip are mounted on two surfaces, respectively, of a lead frame, the surfaces forming a step gap with respect to a center axis of the plug inserted into the holder body, where the light-emitting chip and the light-receiving chip are integrally molded with a light-pervious resin.

In the jack module for optical transmission of this invention, the surface of the lead frame on which the light-emitting chip is mounted and the surface thereof on which the light-receiving chip is mounted form a step gap with respect to the center axis of the plug inserted into the holder body. Therefore, by making the light-emitting chip and the light-receiving chip overlapping each other to some extent, as viewed from the end face of the plug inserted into the holder body, the light-emitting chip and the light-receiving chip can be disposed within a small angular range from the center axis of the plug, as compared with the case where the common chip-mounted surface is disposed vertical to the center axis of the plug. In this case, optical coupling between the end face of the plug and the light-emitting chip or the light-receiving chip is fulfilled with a simple structure using no optical branch elements such as prisms or beam splitters. Accordingly, communications in the half-duplex method can easily be performed with a combination of one transmission cable having specified plugs at both ends and a pair of the jack modules for optical transmission according to the invention. Also, since the optical semiconductor device is so constructed that the light-emitting chip and the light-receiving chip are mounted on the common lead frame, where the light-emitting chip and the light-receiving chip are integrally molded with a light-pervious resin, commonization of terminals and reduction in parts count become achievable, as compared with the case where those chips are molded independently of each other. Accordingly, the apparatus can be reduced in size and cost. Moreover, since the chip-mounted surface of the lead frame does not need to be inclined, the jack module for optical transmission can be made small in size.

In one embodiment, with respect to the two surfaces of the lead frame, the light-emitting chip is disposed on one surface closer to an end face of the plug, and the light-receiving chip is disposed on the other surface farther from the end face of the plug.

In the jack module for optical transmission of this embodiment, optical coupling efficiency between the end face of the plug and the light-emitting chip or the light-receiving chip is improved, as compared with the opposite case, i.e., a case where the light-receiving chip is disposed on one surface closer to the end face of the plug and the light-emitting chip is disposed on another surface farther from the end face of the plug.

In one embodiment, the light-emitting chip and the light-receiving chip are so disposed as to overlap each other as viewed from one side from which the plug is inserted, and as to be spatially separated from each other.

The light-emitting chip is designed so as to be sized smaller than the light-receiving chip, for usage in ordinary optical communications. Therefore, in the jack module for optical transmission of this embodiment, the light-emitting chip and the light-receiving chip are so disposed as to overlap each other as viewed from one side from which the plug is inserted, and as to be spatially separated from each other. As a result of this, as viewed from the end face of the plug inserted into the holder body, the light-emitting chip and the light-receiving chip can be disposed within an even smaller angular range from the center axis of the plug. Accordingly, optical coupling efficiency between the end face of the plug and the light-emitting chip or the light-receiving chip can be further improved.

In one embodiment, the optical semiconductor device has lead pins protruding from inside to outside of the light-pervious resin, and a lead pin to be used for a same function between the light-emitting chip and the light-receiving chip is commonized.

The "lead pin to be used for a same function" is exemplified by a lead pin for feeding power supply voltage to the light-emitting device and the light-receiving device, a lead pin for feeding ground potential (GND), or the like. Also, the term, "commonized," means that the lead pin is electrically connected to both the light-emitting chip and the light-receiving chip, e.g., lead pins themselves are commonized, or one lead pin is connected by wire to both the light-emitting chip and the light-receiving chip inside the light-pervious resin.

In the jack module for optical transmission of this embodiment, since lead pins to be used for same functions between the light-emitting chip and the light-receiving chip are commonized, the number of lead pins is reduced, as compared with the case where the lead pins are provided independently for the light-emitting chip and the light-receiving chip, respectively. Accordingly, this jack module for optical transmission is reduced in size.

In one embodiment, a conversion circuit for converting an optical signal received by the light-receiving element to an electric signal, and a drive circuit for driving the light-emitting chip, are integrated on the light-receiving chip.

In the jack module for optical transmission of this embodiment, parts count is reduced, as compared with the case where the conversion circuit and/or the drive circuit are provided as chips separate from the light-emitting chip and the light-receiving chip. Accordingly, this jack module for optical transmission is reduced in size and manufacturable at low cost.

The plug-and-jack type optical transmission apparatus of this invention comprises in combination, a signal-transmission cable having specified plugs at both ends, and a pair of the jack modules for optical transmission as defined above.

According to the plug-and-jack type optical transmission apparatus of this invention, communications in the half-duplex method can easily be performed through the signal-transmission cable between electronic equipments having the jack modules for optical transmission respectively. Also, since the jack module for optical transmission is simple in construction and manufacturable at small size and low cost as already described, this plug-and-jack type optical transmission apparatus becomes manufacturable at small size and low cost.

The plug-and-jack type optical transmission apparatus of this invention comprises in combination, a signal-transmission cable having specified plugs at both ends, the jack module for optical transmission as defined above, and a jack module for optical transmission having a one-way communications function of transmission or reception.

According to the plug-and-jack type optical transmission apparatus of this invention, communications can be performed between a jack module for optical transmission having a one-way communications function of transmission or reception and mounted on conventional equipment, and the jack module for optical transmission according to the present invention, so that communications with conventional equipment are enabled. Also, since the jack module for optical transmission is simple in construction and manufacturable at small size and low cost as already described, this plug-and-jack type optical transmission apparatus becomes manufacturable at small size and low cost.

In one embodiment, each of the optical semiconductor devices included in the pair of jack modules for optical transmission has a control terminal for controlling transmission of an optical signal by the light-emitting chip and reception of an optical signal by the light-receiving chip.

According to the plug-and-jack type optical transmission apparatus of this embodiment, communications in the half-duplex method are easily implemented. In more detail, in the transmission-side jack module for optical transmission, under the control via the control terminal, the light-emitting chip is driven so that an optical signal is transmitted, while operation of the light-receiving chip is halted. In the reception-side jack module for optical transmission, under the control via the control terminal, operation of the light-emitting chip is halted, while the light-receiving chip is operated so that the optical signal is received. Accordingly, there occur no malfunctions due to optical crosstalk. Further, since unnecessary operations related to reception are halted on the transmission side and unnecessary operations related to transmission are halted on the reception side, power consumption is reduced.

In one embodiment, each of the optical semiconductor devices included in the pair of jack modules for optical transmission performs transmission of an optical signal by the light-emitting chip and reception of an optical signal by the light-receiving chip concurrently.

According to the plug-and-jack type optical transmission apparatus of this embodiment, a control section for halting unnecessary operations related to reception during transmission and halting unnecessary operations related to transmission during reception is provided in electronic equipment having the jack module for optical transmission, by which communications in the half-duplex method are implemented. With this arrangement, the jack module for optical transmission is simplified in construction.

The jack module for both optical and electrical use of this invention comprises, on the holder body of the jack module for optical transmission as defined above, an electrical connection terminal for discriminating type of an inserted plug and for inputting and outputting an electric signal via the plug.

According to the jack module for both optical and electrical use of this invention, the type of a plug inserted into the holder body can be discriminated by the electrical connection terminal. In addition to this, electric signals can be inputted and outputted via the plug by the electrical connection terminal.

The plug-and-jack type transmission apparatus for both optical and electrical use of this invention comprises on the holder body of the jack module for optical transmission included in the plug-and-jack type optical transmission apparatus as defined above, an electrical connection terminal for discriminating type of an inserted plug and for inputting and outputting an electric signal via the plug.

According to the plug-and-jack type transmission apparatus for both optical and electrical use of this invention, the type of a plug inserted into the holder body can be discriminated by the electrical connection terminal. In addition to this, electric signals can be inputted and outputted via the plug by the electrical connection terminal.

BRIEF DESCRIPTION OF THE DRAWINGS

FIG. 2 is a view showing outlined construction of a plug-and-jack type transmission apparatus for both optical and electrical use according to an embodiment of the invention;

FIG. 6A shows a case where the chip-mounted surface is vertical to the center axis X of the plug and FIG. 6B shows a case where the chip-mounted surface is inclined with respect to the center axis X of the plug;

FIG. 10A is a view showing the constructions of three types of plugs which are intended for use as well as the types of signals to be fed to those plugs, FIG. 10B is a view for explaining how the type of an inserted plug is discriminated, and FIG. 10C is a view showing in correspondence the types of inserted plugs and the voltages V1, V2, V3 of the electrical connection terminals.

DETAILED DESCRIPTION OF THE PREFERRED EMBODIMENTS

Hereinbelow, the present invention is described in detail by way of embodiments thereof illustrated in the accompanying drawings.

Figure 1:
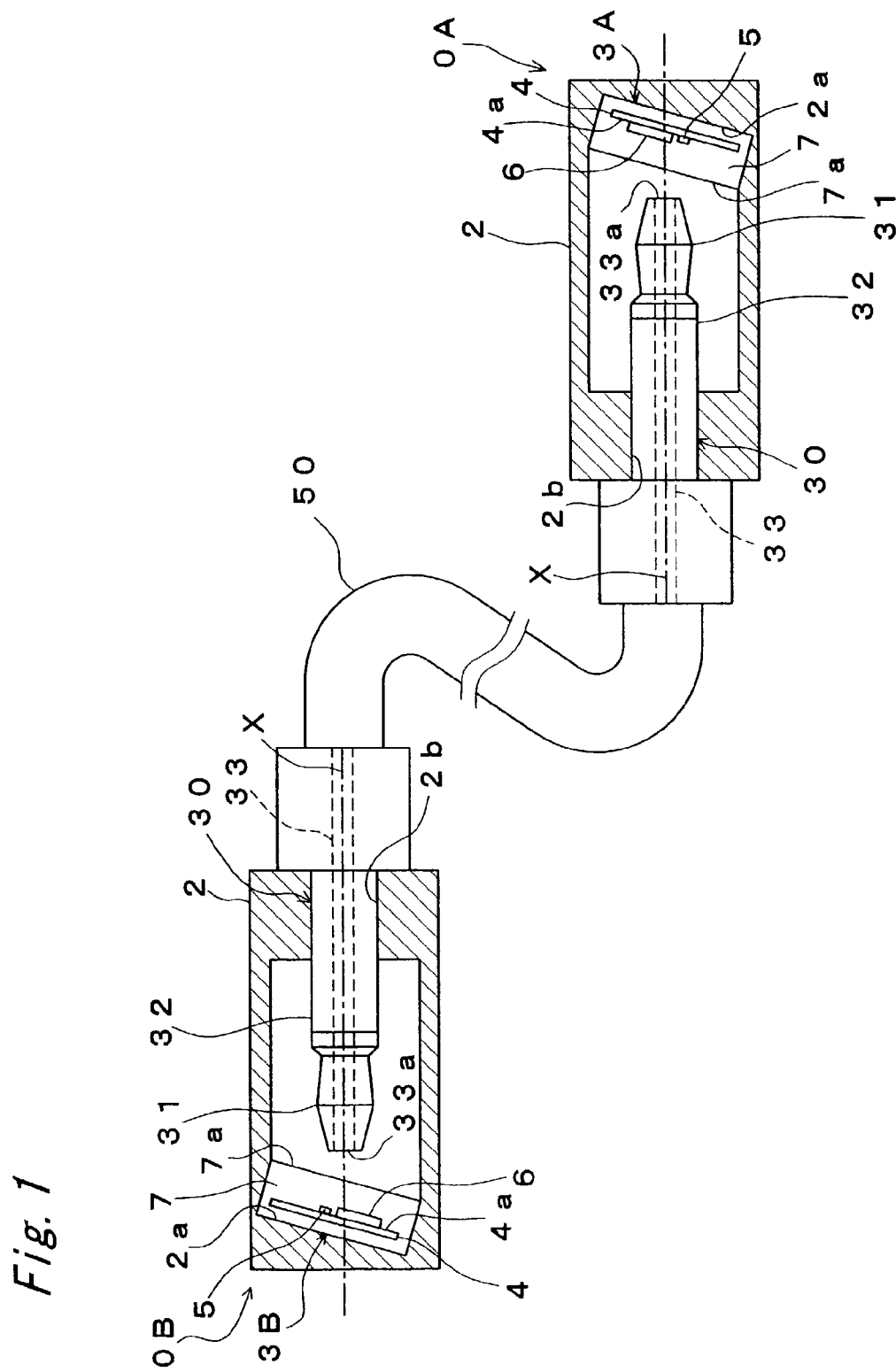
FIG. 1 is a view showing outlined construction of a plug-and-jack type optical transmission apparatus according to an embodiment of the invention.

FIG. 1 shows outlined construction of a plug-and-jack type optical transmission apparatus according to an embodiment of the invention. This plug-and-jack type optical transmission apparatus is made up by combining together a signal-transmission cable 50 having specified plugs 30, 30 at both ends, and a pair of jack modules 0A, 0B for optical transmission. It is assumed that the jack modules 0A, 0B for optical transmission are provided for inputting and outputting signals to and from unshown electronic equipments, respectively. The type of plugs intended for use is only the optical fiber plug 30 for inputting and outputting digital optical signals shown in FIG. 10A.

Figure 2:
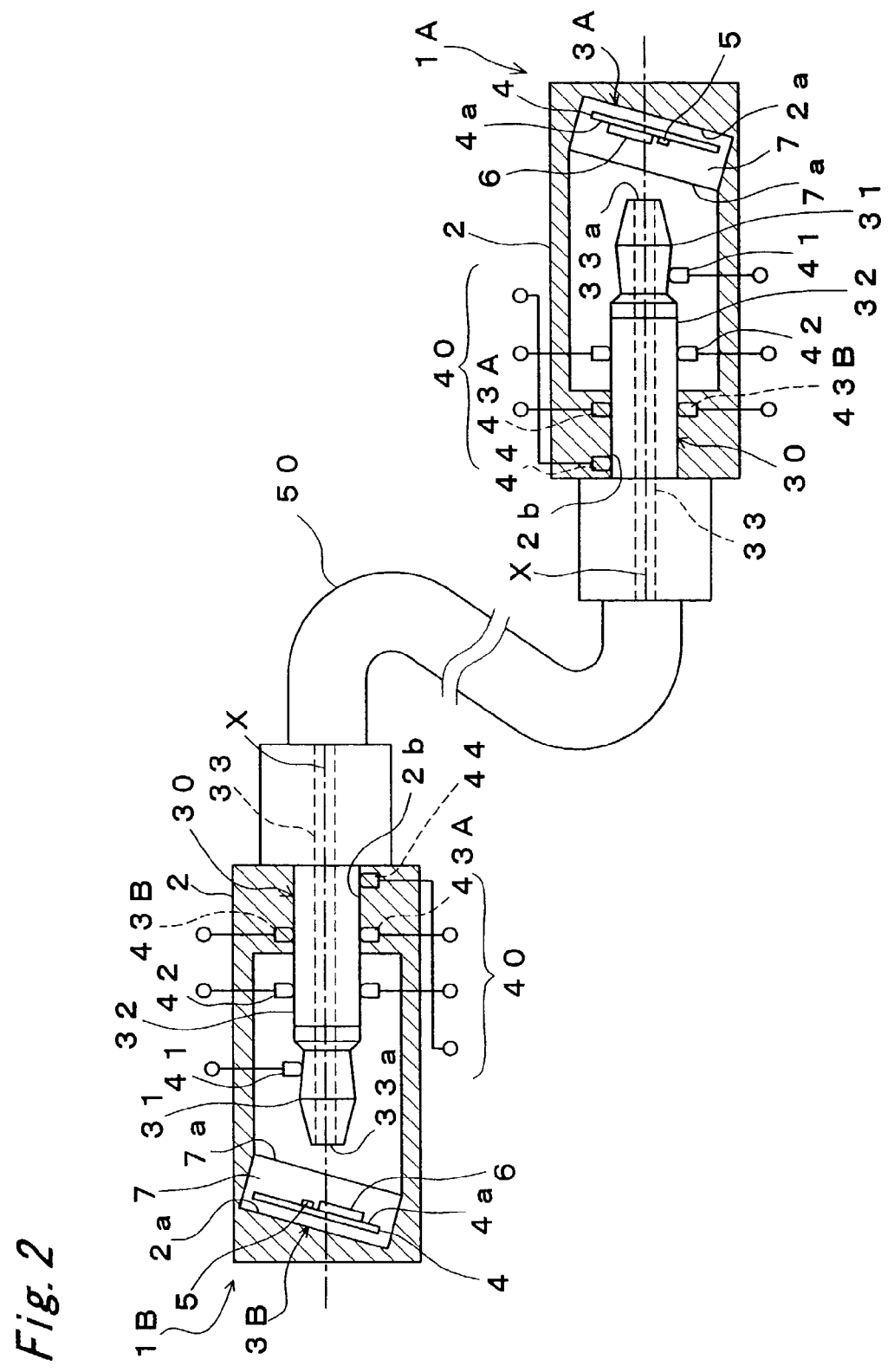

The structural difference between these jack modules 0A, 0B for optical transmission and jack modules 1A, 1B for both optical and electrical use shown in FIG. 2 lies only in that the latter, jack modules 1A, 1B, are equipped with electrical connection terminals 40 for discriminating the type of an inserted plug (whether an optical fiber plug or an electric plug) and for inputting and outputting electric signals via the plug. The jack modules 0A, 0B for optical transmission, as well as a plug-and-jack type optical transmission apparatus having them, fulfills the entirely same functions and produces the same working effects as a jack module for both optical and electrical use as well as a plug-and-jack type transmission apparatus for both optical and electrical use each of which is described below and in each of which the optical fiber plugs 30 are used.

FIG. 2 shows outlined construction of a plug-and-jack type transmission apparatus for both optical and electrical use according to an embodiment of the invention. This plug-and-jack type transmission apparatus for both optical and electrical use is made up by combining together a signal-transmission cable 50 having specified plugs 30, 30 at both ends, and a pair of jack modules 1A, 1B for both optical and electrical use. It is assumed that the jack modules 1A, 1B for both optical and electrical use are provided for inputting and outputting signals to and from unshown electronic equipments, respectively.

The types of plugs intended for use include the electric plug 10 for analog electric signals, the electric plug 20 for digital electric signals, and the optical fiber plug 30 for inputting and outputting digital optical signals as shown in FIG. 10A. FIG. 2 shows an example of use of the optical fiber plug 30. The plugs 10, 20, 30 have identical outside dimensions as defined by standards, and are fittable to a jack hole 2b of a holder body 2 shown in FIG. 2.

One jack module 1A for both optical and electrical use has, on a holder body 2 into which those plural types of plugs are to be inserted, an optical semiconductor device 3A for inputting and outputting optical signals via the plug, and a plurality of electrical connection terminals 40 for discriminating the type of an inserted plug and for inputting and outputting electric signals via the plug. The other jack module 1B for both optical and electrical use is constructed in the entirely same way as the jack module 1A for both optical and electrical use. It is noted that the optical semiconductor device in the jack module 1B for both optical and electrical use is denoted by reference numeral 3B solely for distinction. Although the jack module 1A for both optical and electrical use will principally be described below for convenience' sake, the description is in common to the other jack module 1B for both optical and electrical use.

The electrical connection terminals 40 of the jack module 1A for both optical and electrical use, as in the case of FIG. 10B, are placed at four positions along the center axis X of the plug to be inserted, respectively. The electrical connection terminal in the first position is denoted by reference numeral 41, and so are the electrical connection terminal in the second position by reference numeral 42, the electrical connection terminals in the third position by reference numerals 43A, 43B, and the electrical connection terminal in the fourth position by reference numeral 44. As in the case described for FIG. 10B, the type of an inserted plug can be discriminated based on voltages V1, V2 and V3 of the electrical connection terminals 43A, 43B placed at the third position and the electrical connection terminal 44 placed at the fourth position.

If the inserted plug is the electric plug 10 for analog electric signals or the electric plug 20 for digital electric signals such as shown in FIG. 10A or 10B, then electric signals can be inputted and outputted via the electrical connection terminal 41 placed at the first position and the electrical connection terminal 42 placed at the second position. For example, in FIG. 2, an analog electric signal fed from a signal processing circuit (not shown) within one-side electronic equipment to the electrical connection terminals 41, 42 of the jack module 1A is transmitted to a signal processing circuit (not shown) within the other-side electronic equipment via the electric plug (10 or 20) inserted into the jack module 1A, the signal-transmission cable, the electric plug (10 or 20) inserted into the jack module 1B, and the electrical connection terminals 41, 42 of the jack module 1B. During communications in electric signals, the optical semiconductor devices 3A, 3B hold in a halt state.

Meanwhile, if the inserted plug is the optical fiber plug 30, the optical semiconductor devices 3A, 3B become operative. Each of the optical semiconductor devices 3A, 3B is so constructed that a light-emitting chip 5 and a light-receiving chip 6 are mounted on one side 4a of a lead frame 4, where the light-emitting chip 5 and the light-receiving chip 6 are integrally molded with a light-pervious resin 7. As a result of this, commonization of terminals and reduction in parts count become achievable, as compared with the case where those chips 5, 6 are molded independently of each other. Accordingly, the apparatus can be reduced in size and cost.

Figure 4B:
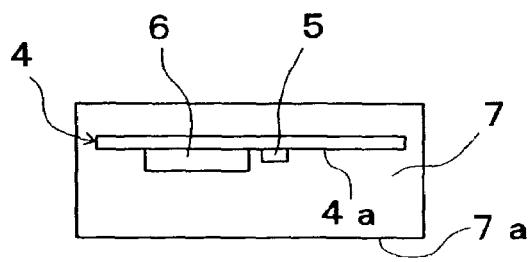
FIGS. 4A–4C are views showing appearance of the optical semiconductor device shown in FIG. 2 and FIG. 3A.
Figure 4A:
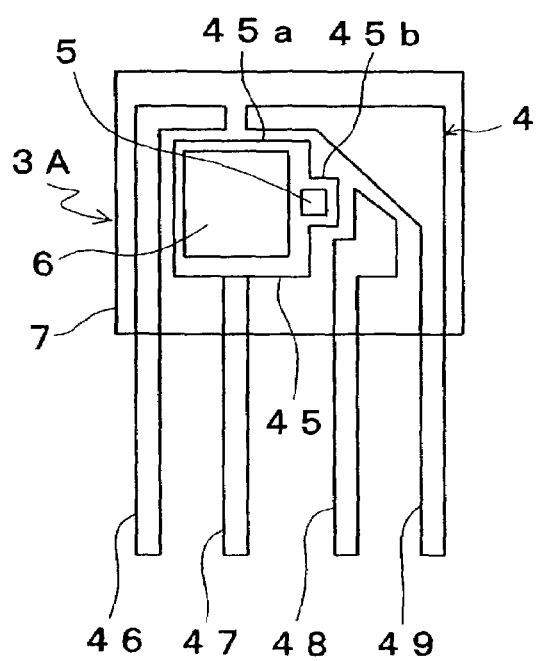
Figure 4C:
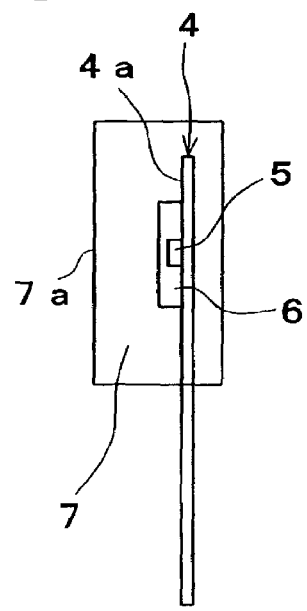

FIG. 4A shows in detail the appearance of the optical semiconductor device 3A (applicable also to 3B), as viewed from the front vertically to the surface 4a of the lead frame 4 on which the light-emitting chip 5 and the light-receiving chip 6 are mounted (hereinafter, referred to as "chip-mounted surface" as appropriate). FIGS. 4B and 4C show the device of FIG. 4A, as viewed from the top and the right side, respectively.

The lead frame 4, which is a planar member formed by machining a metal plate, has a header 45 on which the light-emitting chip 5 and the light-receiving chip 6 are mounted, and lead pins 46, 47, 48, 49 for electrically connecting the mounted chips 5, 6 and an external signal processing circuit to each other. The header 45 is comprised of a generally square-shaped primary portion 45a formed according to the planar size of the light-receiving chip 6 so that the light-receiving chip 6 can be mounted, and a portion 45b formed so as to protrude sideward of the primary portion 45a according to the planar size of the light-emitting chip 5 so that the light-emitting chip 5 can be mounted. As a result of this, the light-emitting chip 5 and the light-receiving chip 6 are mounted in juxtaposition on the surface 4a of the header 45 so as to be slightly spaced from each other with respect to the planar direction. In addition, the chips 5, 6 may be mounted not only on the lead frame 4 but also on a PWB (Printed Wiring Board). That is, a PWB may be used in place of the lead frame 4.

In this example, the light-emitting chip 5 is comprised only of an element that emits light by electric current, such as light-emitting diode (LED) or semiconductor laser. On the other hand, the light-receiving chip 6 includes an integration of a light-receiving element for receiving light such as a photodiode, a conversion circuit for converting an optical signal received by the light-receiving element to an electric signal, and a drive circuit for driving the light-emitting chip 5. As a result of this, parts count is reduced, as compared with the case where the conversion circuit and the drive circuit are provided as chips separate from the light-emitting chip 5 and the light-receiving chip 6. Accordingly, this jack module for both optical and electrical use is reduced in size and manufacturable at low cost. In addition, generally, the light-emitting chip 5 is formed from a material of compound semiconductor, while the light-receiving chip 6, the conversion circuit and the drive circuit are formed from a material of silicon semiconductor. Therefore, the light-receiving chip 6, the conversion circuit and the drive circuit are easy to integrate.

The external shape of the molding resin 7 is a rectangular parallelopiped shape having a plane 7a parallel to the chip-mounted surface 4a of the lead frame 4. The lead pins 46, 47, 48, 49 protrude from inside to outside of the molding resin 7. Since the lead pin 47 for feeding ground potential (GND) to the light-emitting chip 5 and the light-receiving chip 6 is commonized, the number of lead pins is reduced, as compared with the case where those lead pins are provided independently. Accordingly, this jack module for both optical and electrical use is reduced in size.

As shown in FIG. 2, a housing portion 2a for housing the optical semiconductor device 3A is formed in the holder body 2 of the jack module 1A (applicable also to 1B) for both optical and electrical use. This housing portion 2a has a sloped surface inclined with respect to the center axis X of the inserted plug. As a result of this, the chip-mounted surface 4a of the lead frame 4 of the optical semiconductor device 3A housed in the housing portion 2a is disposed so as to be inclined with respect to the center axis X of the plug inserted into the holder body. Accordingly, as viewed from the end face 33a of the plug inserted into the holder body 2, the light-emitting chip 5 and the light-receiving chip 6 can be disposed within a small angular range from the center axis X of the plug, as compared with the case where the chip-mounted surface 4a is disposed vertical to the center axis X of the plug.

It is noted here that since the light-emitting chip 5 comprised of a light-emitting diode (LED) or a semiconductor laser emits light radially with a radiation angle (generally, light-emitting diodes (LEDs) are larger in radiation angle than semiconductor lasers), it is implementable to apply (couple) light to the end face 33a of the optical fiber plug even if the light-emitting chip 5 is disposed so as to be slightly shifted from the center axis X of the plug.

Figure 6A:
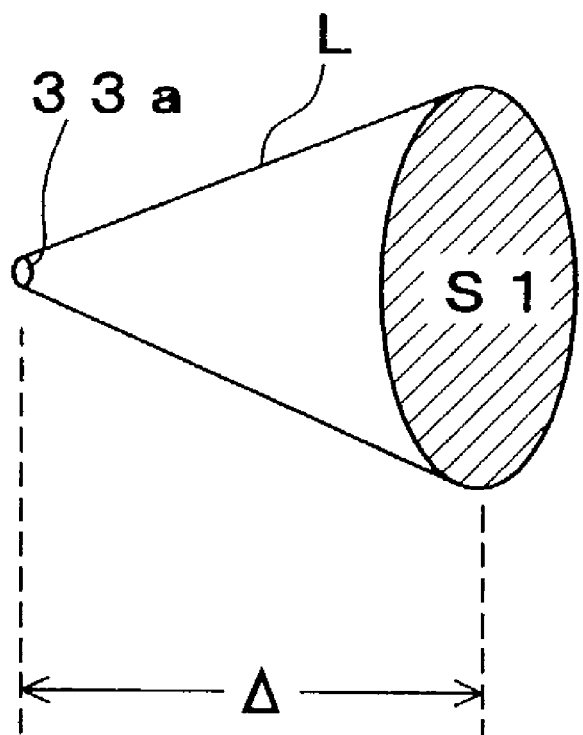
FIGS. 6A and 6B are views schematically showing a region on the chip-mounted surface to which light derived from the end face of the optical fiber plug is applied, where
Figure 6B:
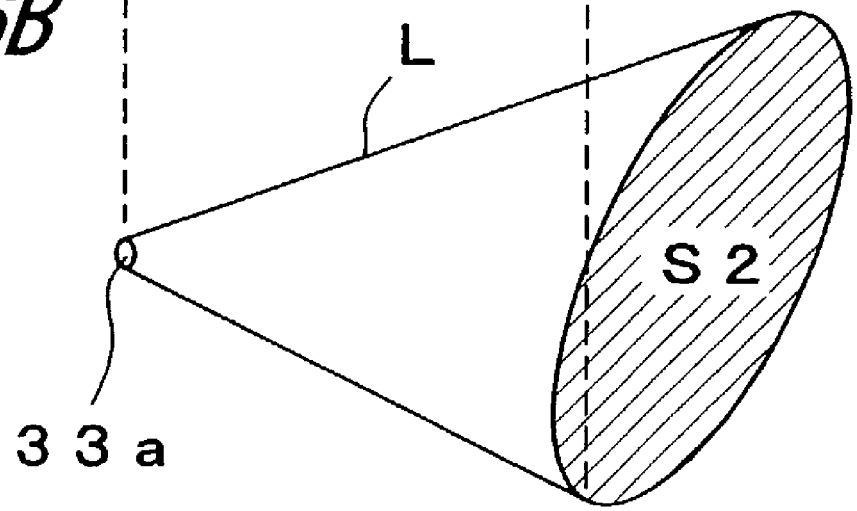

Also, as shown in FIGS. 6A and 6B, light L radiated from the end face 33a of the optical fiber plug is also radiated with a radiation angle according to the NA that depends on the material and structure of the optical fiber. FIG. 6A shows a radiation area S1 over which the light L derived from the end face 33a of the optical fiber plug is radiated to the chip-mounted surface 4a, where the chip-mounted surface 4a is vertical to the center axis X of the plug. FIG. 6B shows a radiation area S2 over which the light L derived from the end face 33a of the optical fiber plug is radiated to the chip-mounted surface 4a, where the chip-mounted surface 4a is inclined with respect to the center axis X of the plug. As can be understood from this, given that the distance Δ from the end face 33a of the optical fiber plug is set equal, the radiation area is larger when the surface 4a is inclined than when vertical. Therefore, given an equal light-receiving area, conversely, the light-receiving chip 6 can be disposed within a smaller angular range from the center axis X of the plug when the chip-mounted surface 4a is inclined than when vertical. Still more, even if the light-receiving chip 6 is disposed so as to be slightly shifted from the center axis X of the plug, it is implementable to receive light. In particular, in plastic optical fibers, which are used for digital/audio signal transmission, the NA (numerical aperture) is 0.5, so that light is radiated within a range of 30° from the end face 33a of the optical fiber plug. In addition, the light-receiving area of the light-receiving chip 6 may be set larger. Generally, increasing in the light-receiving areas of the light-receiving chip 6 causes increasing the electrostatic capacity, which would make an obstacle to high-speed communications. However, since the plug-and-jack type transmission apparatus for both optical and electrical use in this embodiment is applied to signal transmission between digital/audio equipments such as CDs, MDs, DATs, DVDs and AV amplifiers, or information equipments such as computers and PDAs, the increase in electrostatic capacity due to enlargement of the light-receiving area do not matter so much. This is because transmission rates used in these applications at present, which are exemplified by about 6 Mbps at a sampling frequency of 44.1 kHz for use in CDs, about 13 Mbps at a sampling frequency of 96 kHz for use in DVDs, and so on, are much lower transmission rates (1/10–1/100), compared with those of 100 Mbps—several GHz in general optical fiber communications.

Thus, when the chip-mounted surface 4a is disposed so as to be inclined with respect to the center axis X of an inserted plug, optical coupling between the end face 33a of the plug and the light-emitting chip 5 or the light-receiving chip 6 is fulfilled with a simple structure using no optical branch elements such as prisms or beam splitters. Accordingly, communications in the half-duplex method can easily be performed with the structure of the plug-and-jack type transmission apparatus for both optical and electrical use shown in FIG. 2.

For example, a control terminal (not shown) for controlling the transmission of an optical signal by the light-emitting chip 5 and the reception of an optical signal by the light-receiving chip 6 is provided at each of the optical semiconductor devices 3A, 3B included in a pair of the jack modules 1A, 1B for both optical and electrical use. Assume that one jack module 1A for both optical and electrical use serves as the transmission side while the other jack module 1B for both optical and electrical use serves as the reception side. Then, in the transmission-side jack module 1A for both optical and electrical use, under the control via the control terminal, the light-emitting chip 5 of the optical semiconductor device 3A is driven so that an optical signal is transmitted, while operation of the light-receiving chip 6 is halted. Signal light emitted from the light-emitting chip 5 comes incident on the inside of the optical fiber 33 through the end face 33a of the optical fiber plug 30. Then, the incident light is transmitted through the optical fiber cable 50, reaching the reception-side jack module 1B for both optical and electrical use via the optical fiber plug 30 provided at the other end of the optical fiber cable 50. In the reception-side jack module 1B for both optical and electrical use, under the control via the control terminal, operation of the light-emitting chip 5 of the optical semiconductor device 3B is halted, while the light-receiving chip 6 is operated so that the optical signal is received. An output of the light-receiving chip 6 is subjected to signal processing by a signal processing circuit (not shown) of electronic equipment provided with the jack module 1B for both optical and electrical use.

Conversely, assume that the jack module 1A for both optical and electrical use serves as the reception side while the other jack module 1B for both optical and electrical use serves as the transmission side. Then, in the transmission-side jack module 1B for both optical and electrical use, under the control via the control terminal, the light-emitting chip 5 of the optical semiconductor device 3B is driven so that an optical signal is transmitted, while operation of the light-receiving chip 6 is halted. Signal light emitted from the light-emitting chip 5 comes incident on the inside of the optical fiber 33 through the end face 33a of the optical fiber plug 30. Then, the incident light is transmitted in a direction reverse to the foregoing through the optical fiber cable 50, reaching the reception-side jack module 1A for both optical and electrical use via the optical fiber plug 30 provided at the other end of the optical fiber cable 50. In the reception-side jack module 1A for both optical and electrical use, under the control via the control terminal, operation of the light-emitting chip 5 of the optical semiconductor device 3A is halted, while the light-receiving chip 6 is operated so that the optical signal is received. An output of the light-receiving chip 6 is subjected to signal processing by a signal processing circuit (not shown) of electronic equipment provided with the jack module 1A for both optical and electrical use.

Thus, with the implementation of communications in the half-duplex method, there occur no malfunctions due to optical crosstalk. Further, since unnecessary operations related to reception are halted on the transmission side and unnecessary operations related to transmission are halted on the reception side, power consumption is reduced. During communications in optical signals, the electrical connection terminals 40 hold in a halt state.

In each of the optical semiconductor devices 3A, 3B, it is allowable that while the control terminal as described above is omitted, the optical semiconductor devices 3A, 3B included in a pair of the jack modules 1A, 1B for both optical and electrical use each perform the transmission of an optical signal by the light-emitting chip 5 and the reception of an optical signal by the light-receiving chip 6 concurrently. In this case, a control section for halting unnecessary operations related to reception during transmission and halting unnecessary operations related to transmission during reception is provided in electronic equipments having the jack modules 1A, 1B for both optical and electrical use respectively, by which communications in the half-duplex method are implemented. With this arrangement, the jack modules 1A, 1B for both optical and electrical use are simplified in construction.

Moreover, the jack modules 1A, 1B for both optical and electrical use are simple in construction and manufacturable at small size and low cost as described above. Accordingly, this plug-and-jack type transmission apparatus for both optical and electrical use can be manufactured into small size and with low cost.

In this embodiment, the inclination of the surface 4a of the lead frame 4 is set to such a direction that the light-emitting chip 5 is disposed on one side closer to the end face 33a of the plug while the light-receiving chip 6 is disposed on another side farther from the end face 33a of the plug. As a result of this, optical coupling efficiency between the end face 33a of the plug and the light-emitting chip 5 or the light-receiving chip 6 is improved. In addition, the direction of the inclination may be changed unless the end face 33a of the plug and the light-emitting chip 5 or the light-receiving chip 6 come out of optical coupling.

Figure 3A:
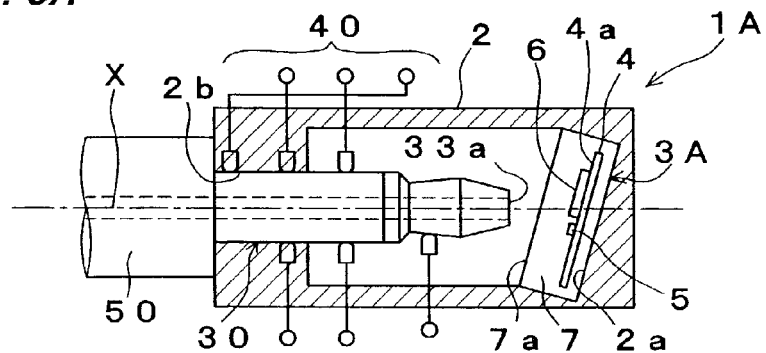
FIGS. 3A–3D are views showing various modifications of the jack module for both optical and electrical use.

FIGS. 3A, 3B, 3C and 3D show various modifications of the jack module for both optical and electrical use. The jack module 1A for both optical and electrical use shown in FIG. 3A is the one shown in FIG. 2.

Figure 3B:
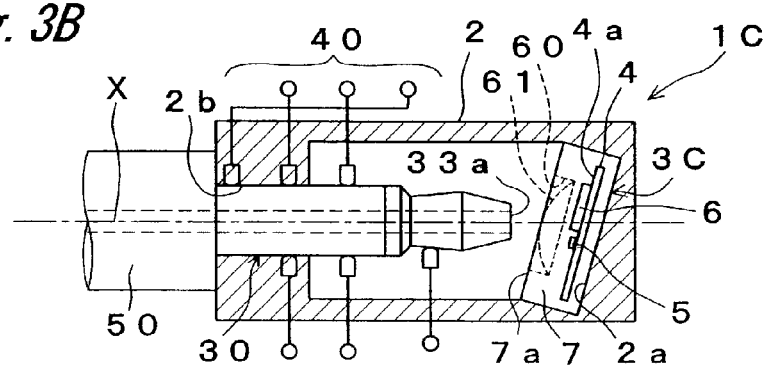

In contrast to this, a jack module 1C for both optical and electrical use shown in FIG. 3B includes an optical semiconductor device 3C in which a recess 60 is formed in a surface 7a of the light-pervious resin 7 and besides a condenser lens 61 is formed within the recess 60. By such an optical semiconductor device 3C being included, the optical coupling efficiency between the end face 33a of the plug and the light-emitting chip 5 or the light-receiving chip 6 can be improved.

Figure 3C:
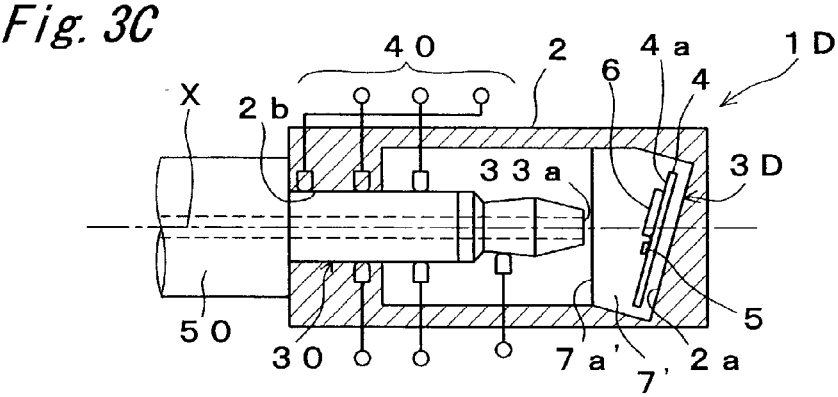
Figure 5B:
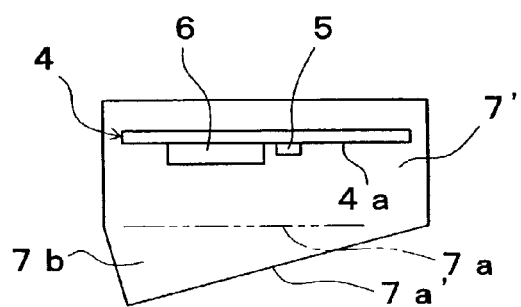
FIGS. 5A–5C are views showing appearance of the optical semiconductor device shown in FIG. 3C.
Figure 5A:
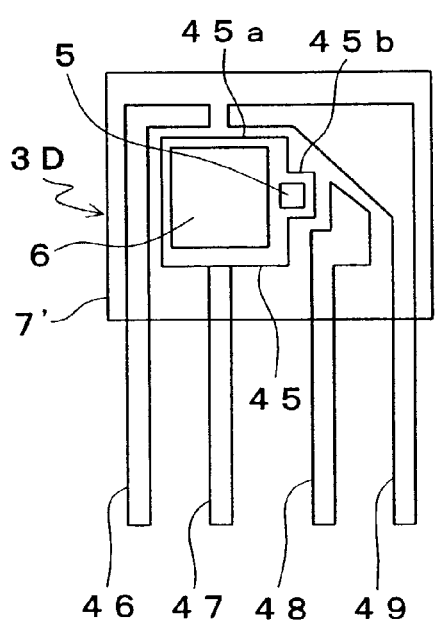
Figure 5C:
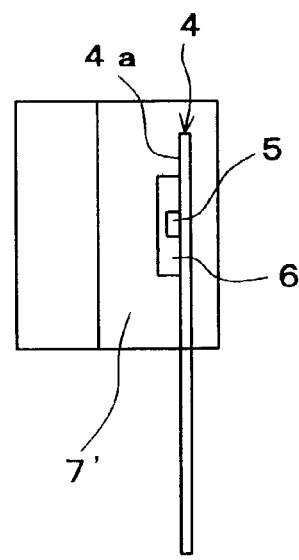

When the molding surface of the optical semiconductor device is disposed so as to be inclined with respect to the center axis X of the plug inserted into the holder body 2 as in the case of the chip-mounted surface 4a of the lead frame 4, the light emitted from the end face 33a of the plug is partly lost by oblique reflection at the molding surface of the optical semiconductor device. Therefore, a jack module 1D for both optical and electrical use shown in FIG. 3C includes an optical semiconductor device 3D in which a surface 7a' of a light-pervious resin 7' is disposed in close contact with the end face 33a of the plug so as to be vertical to the center axis X of the plug. As shown in detail in FIG. 5 (shown in correspondence to FIG. 4), the light-pervious resin 7' of the optical semiconductor device 3D has a forward-projecting portion 7b additionally formed, by which a surface 7a' inclined with respect to the chip-mounted surface 4a of the lead frame 4 is formed (in FIG. 5B, two-dot chain line represents the surface 7a before the deformation). As a result, as shown in FIG. 3C, within the holder body 2, a space between the end face 33a of the plug and the lead frame 4 of the optical semiconductor device 3D is filled with the light-pervious resin 7 of the same composition. With this arrangement, the light emitted from the end face 33a of the plug can be prevented from being partly lost by oblique reflection at the molding surface 7a of the optical semiconductor device.

Figure 3D:
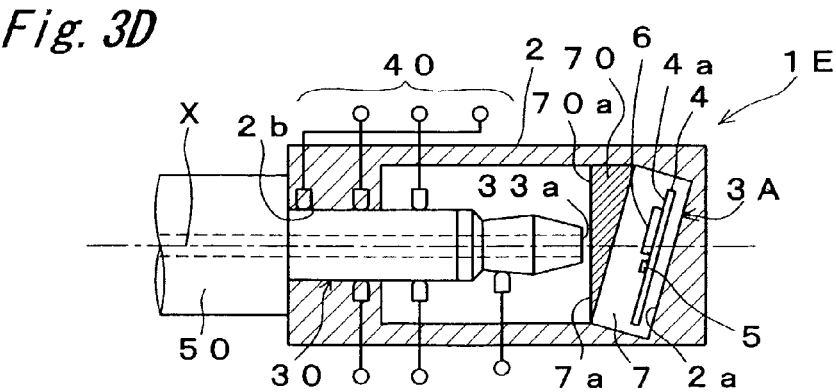

In a jack module 1E for both optical and electrical use shown in FIG. 3D, within the holder body 2, a space between the end face 33a of the plug and the molding surface 7a of the optical semiconductor device 3A is filled with a light-pervious resin 70 having a refractive index lower than that of the light-pervious resin 7. A surface 70a of the light-pervious resin 70 is in close contact with the end face 33a of the plug so as to be vertical to the center axis X of the plug. With this arrangement, light emitted from the end face 33a of the plug reaches the light-receiving chip 6 of the optical semiconductor device 3A with high efficiency. Conversely, light emitted by the light-emitting chip 5 of the optical semiconductor device 3A reaches the end face 33a of the plug with high efficiency, as well. Accordingly, the optical coupling efficiency between the end face 33a of the plug and the light-emitting chip 5 or the light-receiving chip 6 can be improved.

In the above embodiments, the plug-and-jack type transmission apparatus for both optical and electrical use is made up by combining together the signal-transmission cable 50 having specified plugs 30, 30 at both ends, and a pair of the jack modules 1A, 1B for both optical and electrical use. However, the plug-and-jack type transmission apparatus for both optical and electrical use may also be made up by combining together the optical fiber cable 50 having specified plugs 30, 30 at both ends, the jack module 1A for both optical and electrical use or the jack module 1B for both optical and electrical use, and a jack module for both optical and electrical use having a one-way communications function of transmission or reception.

Figure 7A:
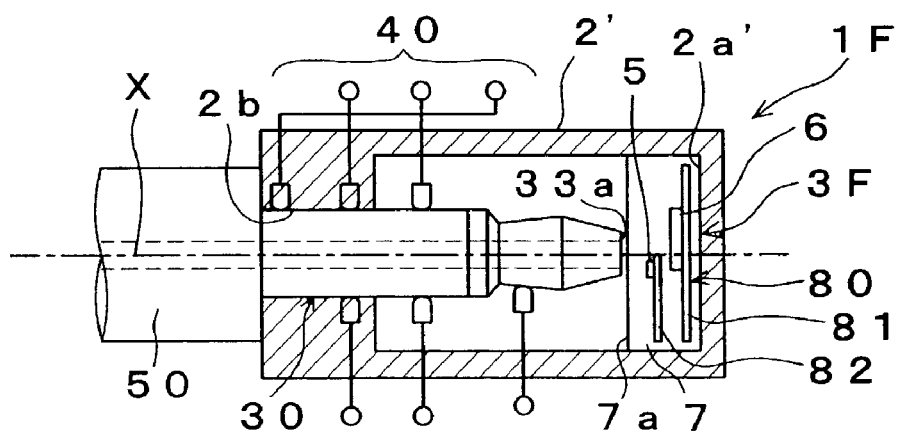
FIGS. 7A and 7B are views showing still further examples of the jack module for both optical and electrical use.
Figure 7B:
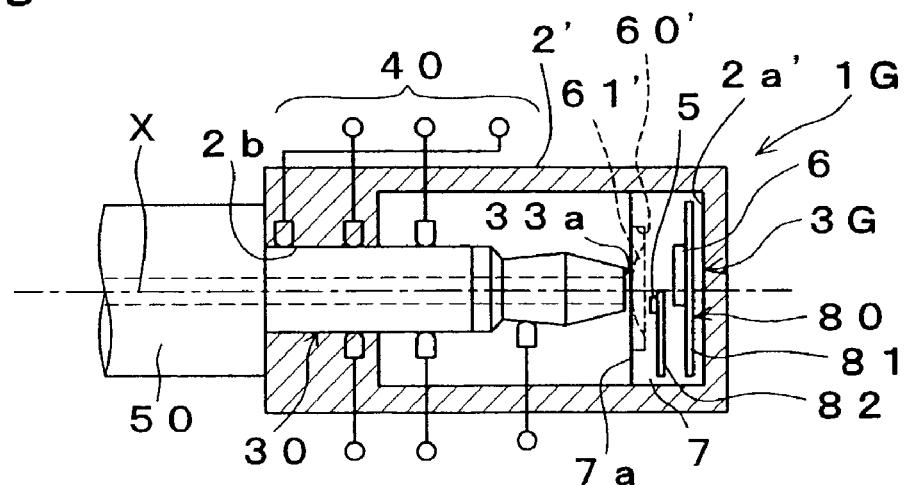

FIGS. 7A and 7B show still further examples of the jack module for both optical and electrical use.

In a jack module 1F for both optical and electrical use shown in FIG. 7A, an optical semiconductor device 3F is housed in a housing portion 2a' of a holder body 2'. The housing portion 2a', unlike the foregoing example, has a wall surface vertical to the center axis X of the plug to be inserted. Meanwhile, the external shape of the molding resin 7, as in the case of the foregoing example, is a rectangular parallelopiped shape having a plane 7a parallel to the chip-mounted surface of a lead frame 80. As a result of this, the lead frame 80 of the optical semiconductor device 3F housed in the housing portion 2a is disposed vertical to the center axis X of the plug.

In this case, the optical semiconductor device 3F is so constructed that a light-emitting chip 5 and a light-receiving chip 6 are mounted on the same side (surface) of two headers 81, 82, respectively, of the lead frame 80, the headers forming a step gap with respect to the center axis X of the plug, where the light-emitting chip 5 and the light-receiving chip 6 are integrally molded with a light-pervious resin 7.

Figure 8B:
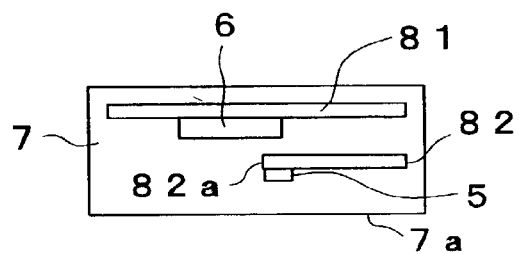
FIGS. 8A–8C are view showing appearance of the optical semiconductor device shown in FIG. 7A.
Figure 8A:
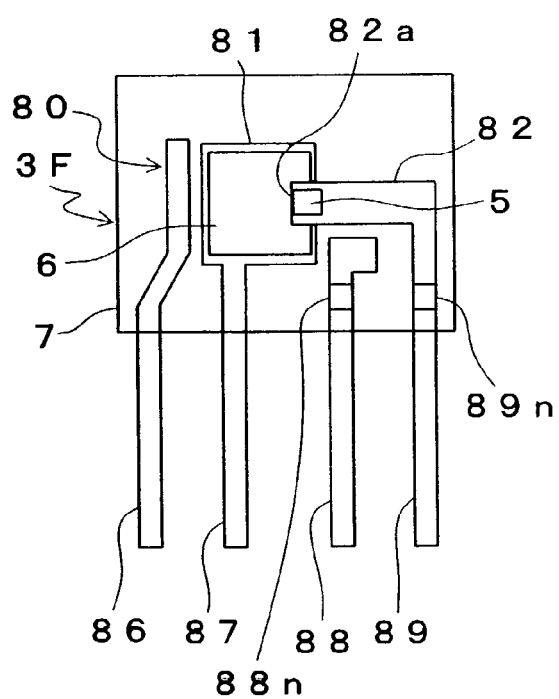
Figure 8C:
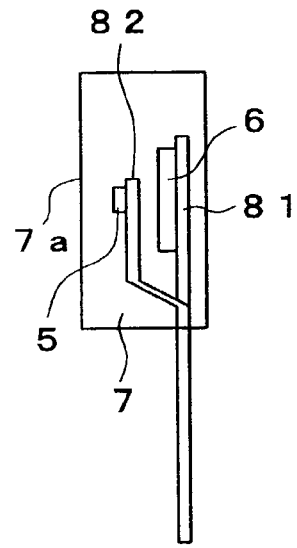
Figure 9A:
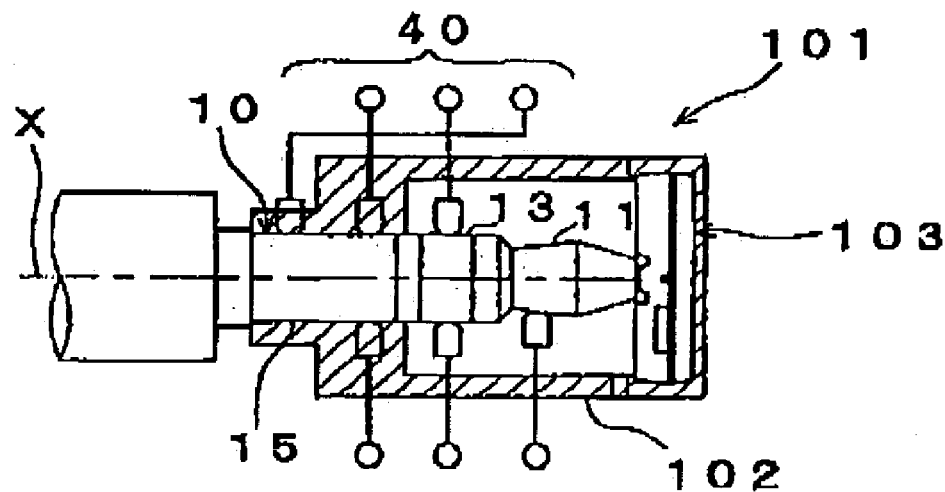
FIG. 9A is a view showing a state in which a small-size single-head electric plug is inserted into a prior-art jack module for both optical and electrical use.
Figure 9B:
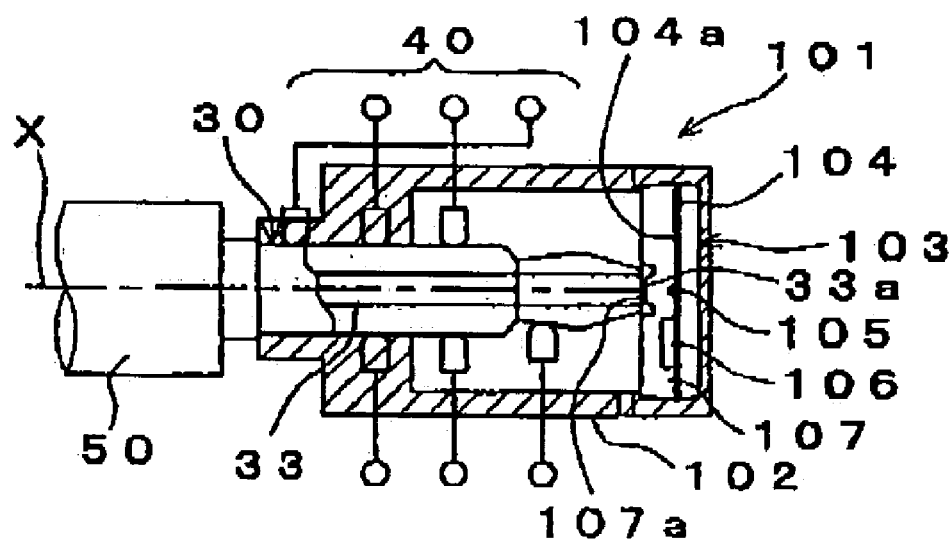
FIG. 9B is a view showing a state in which an optical fiber plug is inserted into the same jack module for both optical and electrical use.

FIGS. 8A–8C show in detail the appearance of the optical semiconductor device 3F in correspondence to FIGS. 4A–4C. In this optical semiconductor device 3F, the lead frame 80, which is formed by machining a metal plate, has a header 81 on which the light-receiving chip 6 is mounted, a header 82 on which the light-emitting chip 5 is mounted, and lead pins 86, 87, 88, 89 for electrically connecting the mounted chips 5, 6 and an external signal processing circuit to each other. The lead pins 86, 87 for the light-receiving chip 6 are formed planar. On the other hand, in the lead pins 88, 89 for the light-emitting chip 5, bent portions 88n, 89n are formed so as to provide a step gap with respect to the center axis X of the plug. The header 81 is formed into a generally square shape according to the planar size of the light-receiving chip 6 so that the light-receiving chip 6 can be mounted. The header 82 is formed into an elongated strip shape, longer in the right-and-left direction in FIG. 8A, its left end 82a overlapping on the header 81. As a result of the mounting of the light-emitting chip 5 at the left end 82a of the header 82, the light-emitting chip 5 and the light-receiving chip 6 overlap each other to some extent. As a result of this, as viewed from the end face 33a of the plug inserted into the holder body 2, the light-emitting chip 5 and the light-receiving chip 6 can be disposed within a small angular range from the center axis X of the plug, as compared with the case where the light-emitting chip 5 and the light-receiving chip 6 are disposed in juxtaposition in a planar direction.

With this arrangement, optical coupling between the end face 33a of the plug and the light-emitting chip 5 or the light-receiving chip 6 is fulfilled with a simple structure using no optical branch elements such as prisms or beam splitters. Accordingly, communications in the half-duplex method can easily be performed by making up the plug-and-jack type transmission apparatus for both optical and electrical use in the same way as shown in FIG. 2 with a pair of the jack modules 1F, 1F for both optical and electrical use. In addition, as in the case of the foregoing example, the direction of signal transmission may be switched either with the provision of a control terminal (not shown) in each of the transmission- and reception-side optical semiconductor devices 3F, 3F, or with the provision of a control section in electronic equipments having the jack modules 1F, 1F for both optical and electrical use respectively.

Since the optical semiconductor device 3F is so constructed that the light-emitting chip 5 and the light-receiving chip 6 are mounted on the common lead frame 80, where the light-emitting chip 5 and the light-receiving chip 6 are integrally molded with the light-pervious resin 7, commonization of terminals and reduction in parts count become achievable, as compared with the case where those chips 5, 6 are molded independently of each other. Accordingly, the apparatus can be reduced in size and cost. Moreover, since the chip-mounted surface of the lead frame 80 does not need to be inclined, the jack module for both optical and electrical use can be made small in size.

With respect to the two headers 81, 82 of the lead frame 80, the light-emitting chip 5 is disposed on the header 82, which is closer to the end face 33a of the plug, while the light-receiving chip 6 is disposed on the header 81, which is the farther from the end face 33a of the plug. The primary reason of this is that the light-emitting chip 5 is designed so as to be sized smaller than the light-receiving chip 6, for usage in ordinary optical communications. As a result of this, optical coupling efficiency between the end face 33a of the plug and the light-emitting chip 5 can be improved.

Further, since the lead frame 80 has a step-gapped three-dimensional structure and the light-emitting chip 5 and the light-receiving chip 6 are disposed in two stages, wire routing to the light-emitting chip 5 and the light-receiving chip 6 can easily be implemented.

Furthermore, a jack module 1G for both optical and electrical use shown in FIG. 7B includes an optical semiconductor device 3G in which a recess 60' is formed in the surface 7a of the light-pervious resin 7, and a condenser lens 61' is formed within the recess 60'. By such an optical semiconductor device 3G being included, the optical coupling efficiency between the end face 33a of the plug and the light-emitting chip 5 or the light-receiving chip 6 can be improved.

What is claimed is:

1. A jack module for optical transmission comprising:
a holder body into which a specified plug is to be inserted; and
an optical semiconductor device for inputting and outputting an optical signal via the plug, wherein
the optical semiconductor device is so constructed that a light-emitting chip and a light-receiving chip are mounted on one side of the same header of a lead frame, where the light-emitting chip and the light-receiving chip are integrally molded with a light-pervious resin, and
the side of the header of the lead frame is disposed so as to be inclined with respect to a center axis of the plug inserted into the holder body,
wherein within the holder body, a space between the end face of the plug and the molding surface of the optical semiconductor device is filled with a light-pervious resin having a refractive index lower than a refractive index of the light-pervious resin used to mold the light-emitting chip and the light-receiving chip.

2. A jack module for both optical and electrical use comprising, on the holder body of the jack module for optical transmission as defined in claim 1, an electrical connection terminal for discriminating type of an inserted plug and for inputting and outputting an electric signal via the plug.

3. The jack module for optical transmission according to claim 1, wherein
the optical semiconductor device has lead pins protruding from inside to outside of the light-pervious resin; and
a lead pin to be used for a same function between the light-emitting chip and the light-receiving chip is commonized.

4. The jack module for optical transmission according claim 1, wherein
a conversion circuit for converting an optical signal received by the light-receiving element to an electric signal, and a drive circuit for driving the light-emitting chip, are integrated on the light-receiving chip.

5. A jack module for optical transmission, comprising:
a holder body into which a specified plug is to be inserted; and
an optical semiconductor device for inputting and outputting an optical signal via the plug, wherein
the optical semiconductor device is so constructed that a light-emitting chip and a light-receiving chip are mounted on one side of a single lead frame, where the light-emitting chip and the light-receiving chip are integrally molded with a light-pervious resin, and the surface of the lead frame is disposed so as to be inclined with respect to a center axis of the plug inserted into the holder body,
and wherein the inclination of the surface of the lead frame is set to such a direction that the light-emitting chip is disposed on one side closer to the end face of the plug while the light-receiving chip is disposed on another side farther from the end face of the plug.

6. A jack module for optical transmission comprising:
a holder body into which a specified plug is to be inserted; and
an optical semiconductor device for inputting and outputting an optical signal via the plug, wherein
the optical semiconductor device is so constructed that a light-emitting chip and a light-receiving chip are mounted on two surfaces, respectively, of a lead frame, the surfaces forming a step gap in a direction of a center axis of the plug inserted into the holder body, where the light-emitting chip and the light-receiving chip are integrally molded with a light-pervious resin.

7. The jack module for optical transmission according to claim 6, wherein
with respect to the two surfaces of the lead frame, the light-emitting chip is disposed on one surface closer to an end face of the plug, and the light-receiving chip is disposed on the other surface farther from the end face or the plug.

8. The jack module for optical transmission according to claim 7, wherein
the light-emitting chip and the light-receiving chip are so disposed as to overlap each other as viewed from one side from which the plug is inserted, and as to be spatially separated from each other.

9. The jack module for optical transmission according to claim 6, wherein
the light-emitting chip and the light-receiving chip are so disposed as to overlap each other as viewed from one side from which the plug is inserted, and as to be spatially separated from each other.

10. The jack module for optical transmission according to claim 6, wherein
the optical semiconductor device has lead pins protruding from inside to outside of the light-pervious resin; and
a lead pin to be used for a same function between the light-emitting chip and the light-receiving chip is commonized.

11. The jack module for optical transmission according to claim 6, wherein
a conversion circuit for converting an optical signal received by the light-receiving element to an electric signal, and a drive circuit for driving the light-emitting chip, are integrated on the light-receiving chip.

12. A jack module for both optical and electrical use comprising, on the holder body of the jack module for optical transmission as defined in claim 6, an electrical connection terminal for discriminating type of an inserted plug and for inputting and outputting an electric signal via the plug.

13. A plug-and-jack type optical transmission apparatus comprising in combination:
a signal-transmission cable having specified plugs at both ends; and
a pair of jack modules for optical transmission, each of the jack modules comprising:
a holder body into which a specified plug is to be inserted; and an optical semiconductor device for inputting and outputting an optical signal via the plug, wherein the optical semiconductor device is so constructed that a light-emitting chip and a light-receiving chip are mounted on one side of a single lead frame, where the light-emmitting chip and the light-receiving chip are integrally molded with a light-pervious resin, and the surface of the lead frame is disposed so as to be inclined with respect to a center axis of the plug inserted into the holder body.

14. The plug-and-jack type optical transmission apparatus according to claim 13, wherein each of the optical semiconductor devices included in the pair of jack modules for optical transmission has a control terminal for controlling transmission of an optical signal by the light-emitting chip and reception of an optical signal by the light-receiving chip.

15. The plug-and-jack type optical transmission apparatus according to claim 13, wherein each of the optical semiconductor devices included in the pair of jack modules for optical transmission performs transmission of an optical signal by the light-emitting chip and reception of an optical signal by the light-receiving chip concurrently.

16. A plug-and-jack type transmission apparatus for both optical and electrical use comprising, on the holder body of the jack module for optical transmission included in the plug-and-jack type optical transmission apparatus as defined in claim 13, an electrical connection terminal for discriminating type of an inserted plug and for inputting and outputting an electric signal via the plug.

17. A plug-and-jack type optical transmission apparatus comprising in combination:

a signal-transmission cable having specified plugs at both ends;

a jack module for optical transmission comprising:
  a holder body into which a specified plug is to be inserted; and an optical semiconductor device for inputting and outputting an optical signal via the plug, wherein
  the optical semiconductor device is so constructed that a light-emitting chip and a light-receiving chip are mounted on one side of a single lead frame, where the light-emitting chip and the light-receiving chip are integrally molded with a light-pervious resin, and
  the surface of the lead frame is disposed so as to be inclined with respect to a center axis of the plug inserted into the holder body; and a jack module for optical transmission having a one way communications function of transmission or reception.

18. A plug-and-jack type transmission apparatus for both optical and electrical use comprising, on the holder body of the jack module for optical transmission included in the plug-and-jack type optical transmission apparatus as defined in claim 17, an electrical connection terminal for discriminating type of an inserted plug and for inputting and outputting an electric signal via the plug.

19. A plug-and-jack type optical transmission apparatus comprising in combination:

a signal-transmission cable having specified plugs at both ends; and a pair of jack modules for optical transmission, each of the jack modules comprising:
  a holder body into which a specified plug is to be inserted; and
  an optical semiconductor device for inputting and outputting an optical signal via the plug, wherein
  the optical semiconductor device is so constructed that a light-emitting chip and a light-receiving chip are mounted on two surfaces, respectively, of a lead frame, the surfaces forming a step gap in a direction of a center axis of the plug inserted into the holder body, where the light-emitting chip and the light-receiving chip are integrally molded with a light-pervious resin.

20. The plug-and-jack type optical transmission apparatus according to claim 19, wherein each of the optical semiconductor devices included in the pair of jack modules for optical transmission has a control terminal for controlling transmission of an optical signal by the light-emitting chip and reception of an optical signal by the light-receiving chip.

21. The plug-and-jack type optical transmission apparatus according to claim 19, wherein each of the optical semiconductor devices included in the pair of jack modules for optical transmission performs transmission of an optical signal by the light-emitting chip and reception of an optical signal by the light-receiving chip concurrently.

22. A plug-and-jack type optical transmission apparatus comprising in combination:

a signal-transmission cable having specified plugs at both ends;

a jack module for optical transmission comprising:
  a holder body into which a specified plug is to be inserted; and
  an optical semiconductor device for inputting and outputting an optical signal via the plug, wherein
  the optical semiconductor device is so constructed that a light-emitting chip and a light-receiving chip are mounted on two surfaces, respectively, of a lead frame, the surfaces forming a step gap in a direction of a center axis of the plug inserted into the holder body, where the light-emitting chip and the light-receiving chip are integrally molded with a light-pervious resin; and a jack module for optical transmission having a one-way communications function of transmission or reception.

* * * * *